United States Patent
Qi et al.

(10) Patent No.: US 9,188,718 B2
(45) Date of Patent: Nov. 17, 2015

(54) COLOR FILTER SUBSTRATE COMPRISING A FIRST FILTER BLOCK HAVING AN AREA LESS THAN AN AREA OF A COLORFUL FILTER BLOCK AND LIQUID CRYSTAL DISPLAY

(75) Inventors: Yonglian Qi, Beijing (CN); Jianshe Xue, Beijing (CN)

(73) Assignee: BOE TECHNOLOGY CO., LTD., Beijing (CN)

( * ) Notice: Subject to any disclaimer, the term of this patent is extended or adjusted under 35 U.S.C. 154(b) by 570 days.

(21) Appl. No.: 13/465,141

(22) Filed: May 7, 2012

(65) Prior Publication Data
US 2012/0287382 A1    Nov. 15, 2012

(30) Foreign Application Priority Data
May 9, 2011  (CN) ....................... 2011 2 0144315 U

(51) Int. Cl.
*G02F 1/1335* (2006.01)
*G02B 5/20* (2006.01)

(52) U.S. Cl.
CPC .......... *G02B 5/201* (2013.01); *G02F 1/133512* (2013.01); *G02F 1/133514* (2013.01)

(58) Field of Classification Search
USPC ......................................... 349/106
See application file for complete search history.

(56) References Cited

U.S. PATENT DOCUMENTS

| | | | |
|---|---|---|---|
| 2004/0095521 A1* | 5/2004 | Song et al. | 349/61 |
| 2005/0151752 A1* | 7/2005 | Phan | 345/589 |
| 2006/0267892 A1* | 11/2006 | Pei et al. | 345/88 |
| 2011/0012011 A1* | 1/2011 | Jung et al. | 250/208.1 |

* cited by examiner

*Primary Examiner* — Paul Lee
(74) *Attorney, Agent, or Firm* — Ladas & Parry LLP

(57) ABSTRACT

Embodiments of disclosed technology provide a color filter substrate and a liquid crystal display having the same. The color filter substrate comprises: a base substrate; a plurality of pixels on the base substrate, each of which comprises first filter blocks and colorful filter blocks; and a black matrix disposed on the base substrate for isolating the filter blocks. In each of the pixels, each of the colorful filter blocks is disposed adjoining at least one first filter block to form a sub-pixel.

11 Claims, 4 Drawing Sheets

COLOR FILTER SUBSTRATE COMPRISING A FIRST FILTER BLOCK HAVING AN AREA LESS THAN AN AREA OF A COLORFUL FILTER BLOCK AND LIQUID CRYSTAL DISPLAY

BACKGROUND

Embodiments of disclosed technology relate to a color filter substrate and a liquid crystal display.

Liquid Crystal Displays (LCDs) have high display quality, small volume, low driving voltage, low power consumption, little damage to human eyes, etc., so are mainly employed for the flat panel display devices of personal computers and notebook computers, and have been developed rapidly in the market. A color filter substrate having red, green, and blue primary colorful filter blocks is used for a full-color liquid crystal display. The orientation state of liquid crystal molecules is controlled by changing a driving voltage from a driving integrated chip (IC), and the liquid crystal layer can work as a switch for electing to let light from a backlight module pass through or not. Different colors are formed by adjusting ratio among the three primary colors, so that various colors can be created, and the liquid crystal displays can present sharp, living, and colorful images. Therefore, the color filter substrate is a key component in a liquid crystal display.

At present, a pigment dispersion method is a mainstream method for manufacturing a color filter substrate. In this method, a light blocking matrix (black matrix) for blocking light is firstly formed on a transparent glass substrate, color filter layers of red (R), green (G), and blue (B) primary colors are then sequentially formed. The positions of red, green, and blue colors must be aligned with the sub-pixels on a thin film transistor array substrate which is opposite to the color filter substrate after assembly. Pigment materials for forming the red, green, and blue colorful filter blocks are expensive, and the red, green, and blue colorful filter blocks are formed by a plurality of mask processes, and the processes are repeated with respect to each color. Thus, production efficiency is reduced, and production cost is increased.

Since the pigment dispersion method renders complicate processes and high cost, an ink jet method for forming color filter substrate is gradually developed, in which red (R), green (G), and blue (B) ink tiny drops are sprayed on regions corresponding to sub-pixels on a substrate so as to form sub-pixels. The corresponding sub-pixels respectively transmit red, green, and blue primary color light and block light of the other colors. Ink jet devices simultaneously spray R, G, and B color ink drops on the substrate to form RGB color layers in one step. Thus, the ink jet method for forming the color filter substrate can save the cost and simplify production processes, and the high cost for performing mask processes can also be omitted. For preventing the leakage of light and the mixing of RGB color inks, a dividing wall is usually used for isolating the sub-pixel regions. The black dividing walls (black matrix) can be directly formed on the substrate for the isolation of the sub-pixel regions.

While the method for manufacturing the color filter substrate is further improved, the type of the color filter substrate is also gradually developed. An RGBW color filter substrate (also referred to as "white+color filter substrate") is formed by disposing transparent white colorful filter blocks, i.e., white (W) region, among the RGB colorful filter blocks, so that more light from the backlight module can be pass through and thus the brightness of the image displayed by the liquid crystal panel can be enhanced.

The conventional RGBW color filter substrate has an arrangement of color regions as shown in FIG. 1A or 1B, in which one pixel consists of four sub-pixels, and each sub-pixel corresponds to one of RGBW colors and has the same area as the others. FIG. 1A shows that one pixel consists of four sub-pixels in parallel in the order of RGBW; and FIG. 1B shows that one pixel consists of four sub-pixels in a square arrangement with each color filter occupy one corner. With the arrangement as shown in FIG. 1A, W region is adjoining one of the R, G, and B regions, or when W region is not located at the edge of the pixel regions, it is adjoining two of the R, G, and B regions, thus there is at least one color (e.g., G in FIG. 1A) can not be adjoining W region, so that color mixing is prone to non-uniform. With the arrangement as shown in FIG. 1B, the arrangement of W region with respect to each of the R, G, and B regions is also different, which also cause the non-uniform of the color mixing.

SUMMARY

The embodiments of the disclosed technology provide a color filter substrate and a liquid crystal display having the same. The color filter substrate comprises: a base substrate; a plurality of pixels on the base substrate, each of which comprises first filter blocks and colorful filter blocks; and a black matrix disposed on the base substrate for isolating the filter blocks. In each of the pixels, each of the colorful filter blocks is disposed adjoining at least one first filter block to form a sub-pixel.

Another embodiment of the disclosed technology provides a liquid crystal display includes the above-described color filter substrate.

Further scope of applicability of the present disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the present disclosed technology and wherein.

DETAILED DESCRIPTION

The described embodiment of the disclosed technology provides a color filter substrate, comprising: a base substrate; a plurality of pixels on the base substrate, each of which comprises first filter blocks and colorful filter blocks; and a black matrix disposed on the base substrate for isolating the filter blocks. In each of the pixels, each of the colorful filter blocks is disposed adjoining at least one first filter block to form a sub-pixel.

In order to make the disclosed technology more clearly, a further description is provided with respect to the following embodiments of the disclosed technology.

In the accompanying drawings, as observed in the direction perpendicular to the substrate (the paper), the pixels are arranged along an A-A' direction and a B-B' direction perpendicular to the A-A' direction on the color filter substrate formed on a rectangular substrate, and a black matrix is disposed between two filter blocks to separate the two filter blocks and isolate the two filter blocks. The A-A' direction and the B-B' direction are directions in parallel with two adjacent edges of a rectangular substrate.

In an embodiment of the disclosed technology, the color filter substrate comprises pixels arranged in an array; each pixel comprises RGBW four filter blocks. In each pixel, one sub-pixel consists of one colorful filter block and one white filter block, and a black matrix is disposed between the two filter blocks for isolating them from each other. One pixel comprises three sub-pixels which respectively includes R, G, and B colorful filter blocks, that is, R+W, G+W, and B+W combinations. One pixel is one unit or element for displaying a dot.

Figure 1A:
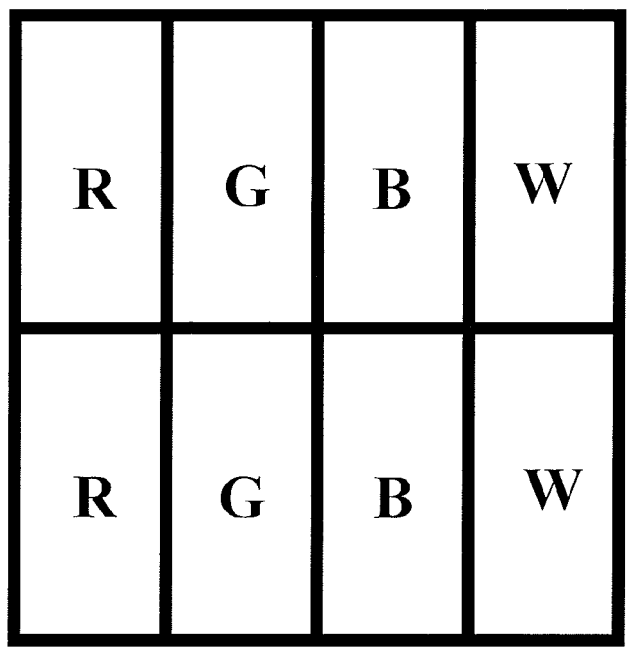
FIG. 1A is a schematic view of a conventional pixel arrangement of RGBW color filter substrate.
Figure 1B:
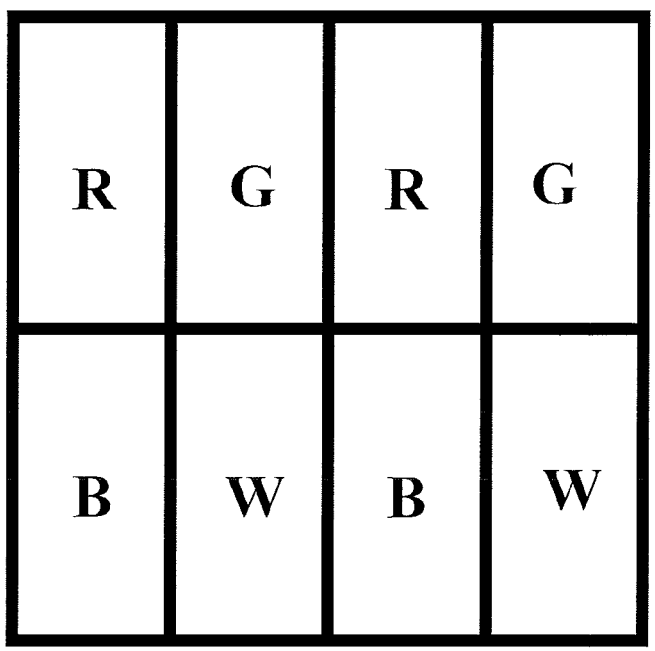
FIG. 1B is a schematic view of another conventional pixel arrangement of RGBW color filter substrate.
Figure 2:
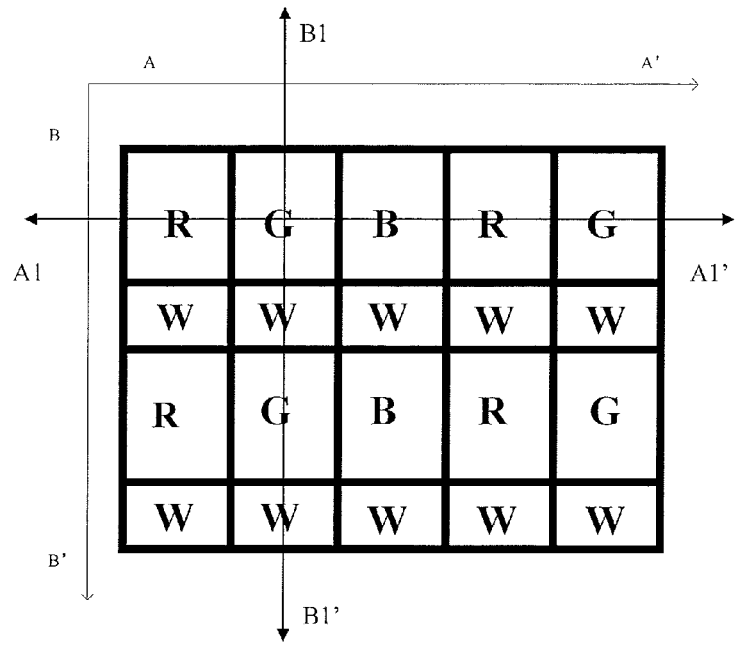
FIG. 2 is a schematic view of a color filter in a color filter substrate according to an embodiment of the disclosed technology.

FIG. 2 shows an example of the embodiment of the disclosed technology. In the drawing, the black thick lines represent a black matrix for isolating respective filter blocks. A colorful filter block and a white filter block are arranged in the B-B' direction in one sub-pixel, and three sub-pixels are arranged in the A-A' direction in one pixel. Also, all filter blocks in the A-A' direction are arranged in rows in a strip shape and in the B-B' direction are similarly arranged in columns in a strip shape; furthermore, the colorful filter blocks in two adjacent sub-pixels along the B-B' direction are of the same color.

As shown in FIG. 2, any colorful filter block (of R, G, or B primary color) is adjoining a white filter block (an example of "first filter block") in the B-B' direction. In the position of non-edge of the entire color filter substrate, any colorful filter block is adjoining white filter blocks on both sides in the B-B' direction, so that the white filter blocks are uniformly distributed among the colorful filter blocks. Thus, the uniformity of the color mixing and the brightness of the color filter substrate can be enhanced.

FIG. 2 only shows one arrangement of strip-shaped filter blocks, and the other arrangements are also possible. For example, the three sub-pixels in one pixel are arranged in the A-A' direction, and the colorful filter block and the white filter block in one sub-pixel are also arranged in the A-A' direction. Or, the three sub-pixels in one pixel are arranged in the B-B' direction, and the colorful filter block and the white filter block in one sub-pixel are also arranged in the B-B' direction.

In the case of these exemplary arrangement, any colorful filter block is adjoining the corresponding white filter block in the A-A' direction or the B-B' direction, so that the color mixing is uniform.

Figure 3:
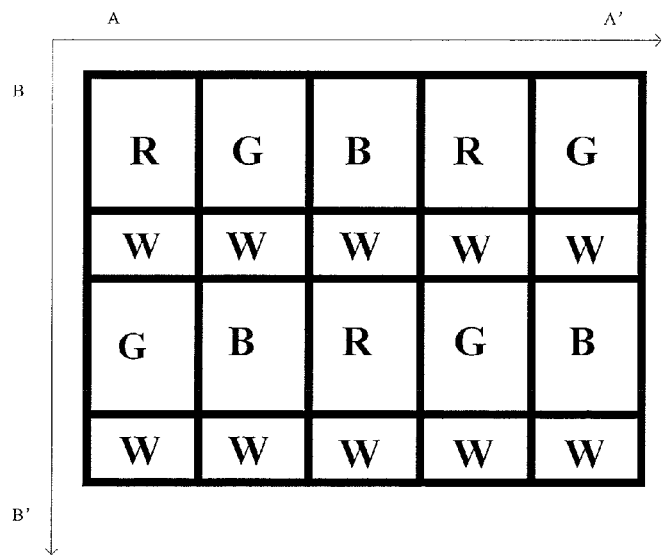
FIG. 3 is a schematic view of a color filter in a color filter substrate according to an embodiment of the disclosed technology.

The above described strip-shaped arrangement is suitable for the liquid crystal display used in a notebook computer or desktop computer, etc. Since most applications have window interface and the content of the interface comprises a plurality of boxes of different sizes, strip-shaped arrangement of the sub-pixels makes the edges of the boxes straighter. However, if the liquid crystal display is used in AV (audio-visual) products, the arrangement of the pixels becomes different. Various lines provided by television signals (or other video signals) are not straight in most of the time, the profiles of the displayed objects are usually formed in irregular curves, so a mosaic arrangement (or referred to as diagonal arrangement) is used in AV products, as shown in FIG. 3. The colorful filter blocks are not arranged in strip shape along the B-B' direction, that is, the colorful filter blocks in two adjacent sub-pixels along the B-B' direction are of different colors, so that any combination of the three adjacent sub-pixels arranged in the A-A' direction or the three adjacent sub-pixels arranged in the B-B' direction can constitute one pixel, and thus the color mixing of the AV products can be improved.

However, those skilled in the relevant field should understand that a color filter may have other primary color arrangement other than RGB (red/green/blue), for example, CMY (cyan/magenta/yellow). Also, the first filter block is not limited to pure white color, as long as the first filter block can enhance the light transmittance.

Figure 4:
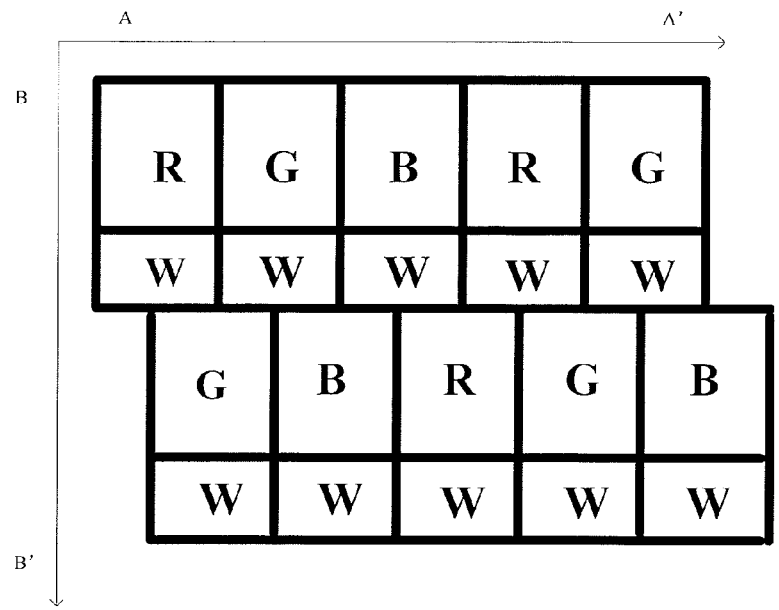
FIG. 4 is a schematic view of a color filter in a color filter substrate according to an embodiment of the disclosed technology.

FIG. 4 shows that the sub-pixels of the color filter substrate in the AV products are arranged in a triangle shape. The colorful filter block and the white filter block in each sub-pixel are arranged still in the B-B' direction, and the filter blocks are arranged in rows in a strip shape along the A-A' direction but are staggered in the B-B' direction. In the case of the triangle arrangement, the profiles of the displayed image become smoother. Another triangle arrangements can be realized by arranging the colorful filter block and the white filter block of each sub-pixel along the A-A' direction, but the sub-pixels are staggered in the B-B' direction.

Figure 5:
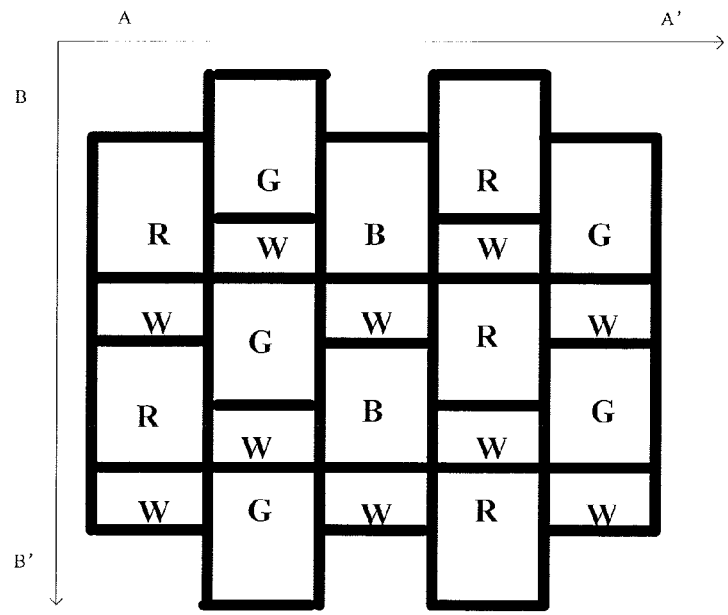
FIG. 5 is a schematic view of a color filter in a color filter substrate according to an embodiment of the disclosed technology.

FIG. 5 shows an arrangement of the filter blocks of another example. In the case of the arrangement shown in FIG. 5, each colorful filter block is adjoining the white filter blocks in both of the A-A' and B-B' directions, so that the color mixing can be more uniform.

The addition of the white filter blocks is intended to improve the brightness of the liquid crystal display using the color filter substrate. More light can pass through the color filter substrate due to existence of the white filter blocks, so that the brightness of the display device can be increased. Compared with a conventional display device using RGB color filter substrate, the display device using the color filter substrate of the disclosed embodiments requires less light from a backlight module to achieve the same brightness, so that the power consumption of the backlight module can be lowered. However, on the other hand, the larger the area of the white filter block in each sub-pixel is, the smaller the area of the colorful filter block become, which influence the chromatic of the liquid crystal display. In an example, the area of the white filter block accounts for ⅓ to ¼ of the area of the entire sub-pixel where the white filter block is included, that is, the area ratio of the white filter block to the colorful filter block located in the same sub-pixel is ½ to ⅓. In this way, the white filter block is uniformly distributed among various colorful filter blocks, so the effect of color mixing is enhanced. Also, since the white filter block is distributed uniformly, the transmittance of the color filter substrate and the chromatic of the liquid crystal display can be maintained while the area of each white filter block is reduced. In FIGS. 2, 3, 4, and 5, the area of the white filter block is controlled according to the above described ratio for illustration purpose only. Especially, in FIG. 5, the colorful filter block and the white filter block of one sub-pixel are arranged in the B-B' direction, and since the area of the color filter is different from that of the white filter block, a width of the white filter block is different from a width of the colorful filter block in the B-B' direction, and thus these filter blocks are not arranged in strip shape along the A-A' direction. Accordingly, any colorful filter block is adjoining the white filter block not only in the A-A' and B-B' directions but also in a diagonal direction.

In another example, in one pixel, the white filter blocks in different sub-pixels can have different areas, and therefore have different area ratios for different colorful filter blocks.

In another embodiment, one planarization layer is provided above the colorful filter blocks and the white filter blocks and functions as a protection layer for the color filter layer on the substrate, which functions to prevent static electric breakdown, provides resistance to abrasion, and block contamination. Also, since the amount of ink drops sprayed from inkjet heads may not be uniform, the thicknesses of respective colorful filter blocks may be slightly different, thus giving rise to step difference, so that the surface comprised by the colorful filter blocks is uneven. The uneven phenomenon is eliminated by coating the planarization layer on the uneven surface. The planarization layer can be formed of a transparent material, so it will not disadvantageously affect light transmittance. During producing the color filter substrate, the white filter blocks and the planarization layer can be formed in one step in one example. Compared with the process in which the formation of the planarization layer is performed after the white filter blocks is formed, the producing processes can be simplified in this example. The white filter blocks and the planarization layer are formed in the same step by coating one transparent resin material on the R, G, B colorful filter blocks that have been formed in an inkjet process and filling up the sub-pixel regions isolated by the black matrix (the white filter block and the planarization layer are formed of the same material). The detailed description of the process is provided as follow.

The respective colorful filter blocks are formed by spraying inks of the respective colors on the corresponding regions isolated by the black matrix on the surface of the substrate. When the colorful filter blocks become dry and solidified, a transparent resin material is directly coated on the base substrate with the colorful filter blocks, white filter regions, and the black matrix. The transparent resin may first flow into the white filter regions to form the white filter blocks. After that, a planarization layer is formed above the white filter blocks and the colorful filter blocks. The coating of the transparent resin can generally be performed by using a coating machine in doctor blade coating mode, spin coating mode, or doctor blade-spin coating mode, and the thickness of the planarization layer is controlled by adjusting the spin rate and the amount of spraying. Forming the white filter blocks and the planarization layer in one step can save the production cost and prevent the color mixing of multiple pixel regions, which may be caused by the misalignment in the inkjet process and the exposure process. It should be noted that the transparent material of the white filter block and the planarization layer may be a material having the required transmittance for display, such as, a transparent photosensitive resin, a two-component curable aqueous transparent resin, etc.

Figure 6A:
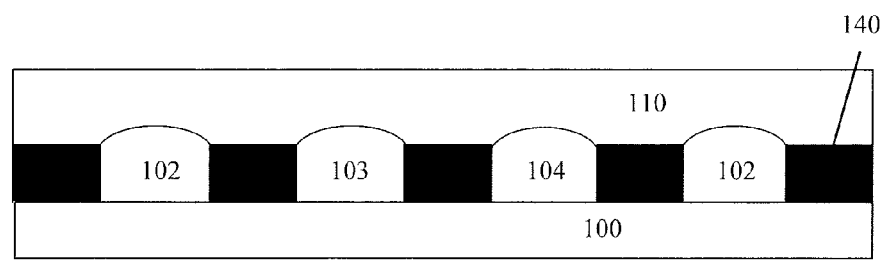
FIG. 6A is a schematic structure sectional view of the color filter substrate taken along A1-A1' line of the embodiment in FIG. 2.

FIG. 6A is a schematic structure sectional view of the color filter substrate take along A1-A1' line of the embodiment in FIG. 2. Red filter blocks 102, blue filter blocks 103, and green filter blocks 104 are filled into the corresponding regions isolated by the black matrix 140 on the base substrate 100 of the color filter substrate, the planarization layer 110 is formed above the colorful filter blocks and the black matrix to eliminate the uneven surface due to the step difference among the pixels and prevent static electric, provide resistance to abrasion, and block contamination.

Figure 6B:
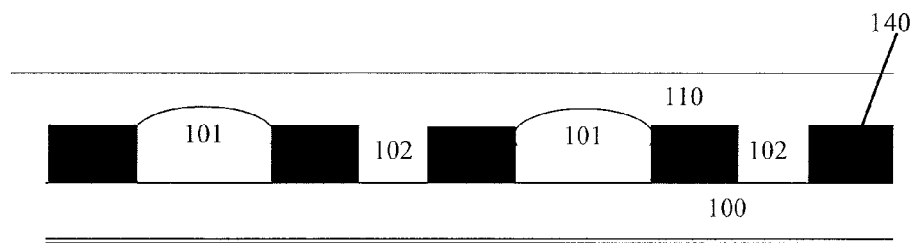
FIG. 6B is a schematic structure sectional view of the color filter substrate taken along B1-B1' line section of the embodiment in FIG. 2.

When the structure of the color filter substrate is viewed along B1-B1' line of the embodiment in FIG. 2, since the white filter blocks 102 and the planarization layer 110 are formed in one step with a same material, FIG. 6B shows a sectional view taken along B1-B1' line in FIG. 2, in which the white filter blocks 102 and the planarization layer 110 are formed integrally.

Another embodiment of the disclosed technology also provides a liquid crystal display having a color filter substrate as described in the above embodiments. The color filter substrate comprises: a base substrate; a plurality of pixels on the base substrate, each of which comprises first filter blocks and colorful filter blocks; and a black matrix disposed on the base substrate for isolating the filter blocks. In each of the pixels, each of the colorful filter blocks is disposed adjoining at least one first filter block to form a sub-pixel. The display device further comprises an array substrate and a liquid crystal layer interposed between the color filter substrate and the array substrate. The pixels of the color filter substrates correspond to the pixels on the array substrate.

In an example, the colorful filter blocks comprise red filter blocks, green filter blocks, and blue filter blocks; and the first filter blocks are with filter blocks. However, those skilled in the relevant field should understand that a color filter may have other primary color arrangement other than RGB (red/green/blue), for example, CMY (cyan/magenta/yellow). Also, the first filter block is not limited to pure white color, as long as the first filter block can enhance the light transmittance.

In an example, the respective colorful filter blocks have the same area, and the area of the first filter blocks is ⅓~½ of the area of the respective colorful filter blocks.

In an example, the color filter substrate further comprises a planarization layer coated on the colorful filter blocks and the first filter blocks, and the planarization layer and the first filter blocks are formed in one step.

In addition, the first filter blocks are transparent photosensitive resin layers.

Since the distribution of the white filter blocks around the colorful filter blocks is uniform, the color mixing and the brightness of the liquid crystal display can be improved. Further, since the area ratio(s) of the white filter blocks to the colorful filter blocks is more reasonable, the chromatic of the liquid crystal display is not influenced while the brightness thereof is increased and the power consumption is reduced. The displaying quality of the liquid crystal display is improved significantly. Moreover, the white filter block and the planarization layer can be formed in one step, so the processes for producing the colorful filter blocks in the liquid crystal display can be simplified and the aperture ratio thereof will not be damaged.

The above embodiments are only the preferable embodiments of the disclosed technology. It should be noted by those skilled in the art that changes and modifications can be made in the solutions of the disclosed technology without depart from the principle of the disclosed technology, and such changes and modifications should be considered as within the scope of the disclosed technology.

What is claimed is:

1. A color filter substrate, comprising:
   a base substrate;
   a plurality of pixels on the base substrate, each of which comprises first filter blocks and colorful filter blocks; and
   a black matrix disposed on the base substrate for isolating the filter blocks,
   wherein in each of the pixels, each of the colorful filter blocks is disposed adjoining at least one first filter block to form a sub-pixel; and
   each colorful filter block is disposed adjoining the first filter blocks in both of a first direction and a second direction perpendicular to the first direction; and
   the respective colorful filter blocks have the same area, and an area of the first filter block is $1/3 \sim 1/2$ of an area of the respective colorful filter block in one sub-pixel.

2. The color filter substrate of claim 1, wherein the colorful filter blocks comprise red filter blocks, green filter blocks, and blue filter blocks.

3. The color filter substrate of claim 2, wherein the first filter blocks comprise white filter blocks.

4. The color filter substrate of claim 3, wherein any colorful filter block is disposed adjoining the at least one first filter blocks of the same sub-pixel in the first direction, and adjacent to colorful filter block of other colors in the second direction.

5. The color filter substrate of claim 1, wherein any colorful filter block is disposed adjoining the at least one first filter blocks of the same sub-pixel and adjoining the first filter block of other sub-pixel in the second direction.

6. The color filter substrate of claim 1, wherein the color filter substrate further comprises a planarization layer coated on the colorful filter blocks and the first filter blocks.

7. The color filter substrate of claim 6, wherein the planarization layer and the first filter blocks are formed integrally.

8. The color filter substrate of claim 6, wherein the first filter blocks are white filter blocks or transparent photosensitive resin layers.

9. A liquid crystal display comprising the color filter substrate of claim 1.

10. The liquid crystal display according to claim 9, further comprising:
    an array substrate; and
    a liquid crystal layer interposed between the color filter substrate and the array substrate.

11. The color filter substrate of claim 1, wherein any colorful filter block is also adjoining the first filter block in a diagonal direction.

* * * * *